(12) United States Patent
Zhou

(10) Patent No.: US 8,779,728 B2
(45) Date of Patent: Jul. 15, 2014

(54) APPARATUS FOR PREHEATING A BATTERY PACK BEFORE CHARGING

(75) Inventor: Peng Zhou, El Cerrito, CA (US)

(73) Assignee: Sinoelectric Powertrain Corporation, Sunnyvale, CA (US)

( * ) Notice: Subject to any disclaimer, the term of this patent is extended or adjusted under 35 U.S.C. 154(b) by 499 days.

(21) Appl. No.: 13/082,185

(22) Filed: Apr. 7, 2011

(65) Prior Publication Data

US 2011/0248684 A1 Oct. 13, 2011

Related U.S. Application Data

(60) Provisional application No. 61/322,235, filed on Apr. 8, 2010.

(51) Int. Cl.
*H02J 7/00* (2006.01)
(52) U.S. Cl.
USPC .......................................................... 320/150
(58) Field of Classification Search
USPC .......................................................... 320/150
See application file for complete search history.

(56) References Cited

U.S. PATENT DOCUMENTS

| | | | |
|---|---|---|---|
| 2,258,221 A | 10/1941 | Rochow | |
| 4,135,593 A | 1/1979 | Fowkes | |
| 4,652,964 A | 3/1987 | Ziegenbein | |
| 4,862,243 A | 8/1989 | Welch et al. | |
| 5,059,895 A | 10/1991 | Cataldi et al. | |
| 5,158,841 A | 10/1992 | Mennicke et al. | |
| 5,207,276 A | 5/1993 | Scofield | |
| 5,227,259 A | 7/1993 | Weaver et al. | |
| 5,534,759 A | 7/1996 | Evans et al. | |
| 5,542,488 A | 8/1996 | Nixon | |
| 5,608,304 A | 3/1997 | Okumura | |
| 5,617,003 A * | 4/1997 | Odachi et al. | 320/108 |
| 5,624,003 A | 4/1997 | Matsuki et al. | |
| 5,670,861 A | 9/1997 | Nor | |
| 5,767,659 A | 6/1998 | Farley | |
| 5,806,618 A | 9/1998 | Luode | |
| 5,815,824 A | 9/1998 | Saga et al. | |
| 5,834,132 A | 11/1998 | Hasegawa et al. | |
| 5,861,610 A | 1/1999 | Weiss | |
| 5,903,154 A | 5/1999 | Zhang et al. | |

(Continued)

FOREIGN PATENT DOCUMENTS

| | | |
|---|---|---|
| JP | 2008288046 A | 11/2008 |
| JP | 2011171255 A | 1/2011 |
| WO | 2005086196 A1 | 9/2005 |

OTHER PUBLICATIONS

International Search Report, mail date Jun. 30, 2011, International Application No. PCT/US2011/031634, 6 pages.

(Continued)

*Primary Examiner* — Edward Tso
*Assistant Examiner* — Ramy Ramadan

(57) ABSTRACT

A system for charging a battery pack of an electric vehicle comprises a heater for pre-heating the battery pack so that the battery pack is able to accept a charge from a charger. The battery pack is selectively de-coupled from the system during the pre-heating. When the battery pack has reached an appropriate temperature, the heater is selectively de-coupled from the system and the charger is coupled to the system to charge the battery. Advantageously, the battery pack is protected during pre-heating.

13 Claims, 2 Drawing Sheets

(56) References Cited

U.S. PATENT DOCUMENTS

| | | |
|---|---|---|
| 5,929,741 A | 7/1999 | Nishimura et al. |
| 5,948,298 A | 9/1999 | Ijaz |
| 6,132,896 A | 10/2000 | Sunderland et al. |
| 6,337,559 B1 | 1/2002 | Sato |
| 6,444,350 B1 | 9/2002 | Toya et al. |
| 6,531,846 B1 | 3/2003 | Smith |
| 6,631,775 B1 | 10/2003 | Chaney |
| 6,747,437 B2 | 6/2004 | Chiu |
| 7,196,286 B2 * | 3/2007 | Kishi et al. ............... 219/216 |
| 7,262,605 B2 | 8/2007 | Seo et al. |
| 7,270,910 B2 | 9/2007 | Yahnker et al. |
| 7,308,216 B2 * | 12/2007 | Kishi et al. ............... 399/70 |
| 7,507,500 B2 | 3/2009 | Donnelly et al. |
| 7,508,171 B2 | 3/2009 | Carrier et al. |
| 7,520,355 B2 | 4/2009 | Chaney |
| 7,528,574 B1 * | 5/2009 | Adkins et al. ............... 320/128 |
| 7,667,432 B2 | 2/2010 | West et al. |
| 7,675,263 B2 | 3/2010 | Kawasumi et al. |
| 7,923,967 B2 | 4/2011 | Hamaguchi et al. |
| 7,952,330 B2 | 5/2011 | Mori |
| 8,004,244 B2 | 8/2011 | Cromer et al. |
| 8,058,846 B2 | 11/2011 | Kim |
| 8,198,975 B2 | 6/2012 | Sha et al. |
| 8,203,312 B2 | 6/2012 | Yoshikawa |
| 8,220,590 B2 * | 7/2012 | Chen et al. ............... 187/290 |
| 8,450,966 B2 * | 5/2013 | Krauer et al. ............... 320/104 |
| 2002/0188387 A1 | 12/2002 | Woestman et al. |
| 2003/0090855 A1 | 5/2003 | Chu et al. |
| 2003/0205421 A1 | 11/2003 | Allen et al. |
| 2004/0018417 A1 | 1/2004 | Stack |
| 2005/0069773 A1 | 3/2005 | Nakai |
| 2005/0089750 A1 | 4/2005 | Ng et al. |
| 2007/0054178 A1 | 3/2007 | Moon et al. |
| 2007/0089442 A1 | 4/2007 | Tsuchiya |
| 2007/0188147 A1 | 8/2007 | Straubel et al. |
| 2008/0053716 A1 | 3/2008 | Scheucher |
| 2008/0096072 A1 | 4/2008 | Fukusako et al. |
| 2008/0230288 A1 | 9/2008 | Shiomi et al. |
| 2008/0275600 A1 | 11/2008 | Rask et al. |
| 2009/0041992 A1 | 2/2009 | Umeda et al. |
| 2009/0123814 A1 | 5/2009 | Cabot et al. |
| 2010/0021802 A1 | 1/2010 | Yang et al. |
| 2010/0136392 A1 | 6/2010 | Pulliam et al. |
| 2011/0050175 A1 | 3/2011 | Odaohhara et al. |
| 2012/0181988 A1 | 7/2012 | Uchibori |

OTHER PUBLICATIONS

Article from Tyco Electronics that was published Apr. 14, 2008, entitled "Polymeric Positive Temperature Coefficient". Retrieved form the Internet<http://tycoelectronics.custhelp.com/. 1 page.

* cited by examiner

APPARATUS FOR PREHEATING A BATTERY PACK BEFORE CHARGING

RELATED APPLICATIONS

This application claims the benefit under 35 U.S.C. §119 (e) of U.S. Provisional Patent Application Ser. No. 61/322,235, filed Apr. 8, 2010, and entitled "APPARATUS FOR PREHEATING A BATTERY PACK BEFORE CHARGING," which is hereby incorporated in its entirety for all purposes.

FIELD OF THE INVENTION

The present invention relates to charging batteries for electric vehicles. More specifically, the present invention relates to pre-heating battery packs before a battery can be charged.

BACKGROUND OF THE INVENTION

For a multitude of reasons, it is advantageous to use electric vehicles having rechargeable batteries rather than vehicles using internal combustion engines. Electric vehicles are inherently more efficient, meaning more energy is used in locomotion than lost to heat than in conventional engines. Also, electric vehicles do not exhaust any byproducts. However, the use of electric vehicles presents technical challenges. For example, the batteries in an electric vehicle must be recharged. Some electric vehicles are commercially targeted toward daily, low mileage use. Such vehicles are ideal for urban commuters. The batteries are chosen to provide a charge for approximately 50 miles before recharging is required. It is also well known that some batteries, for example lithium ion batteries, must be at temperatures above zero degrees centigrade in order to receive a charge. Furthermore, the chemical materials inside most batteries have resistive properties that are inversely proportional to temperature, meaning that as temperature increases, their internal resistance decreases and they are more readily, quickly, and efficiently charged. To that end, electric vehicles come equipped with some sort of apparatus for heating the battery before charging.

FIG. 1 shows a prior art charging system 100 for an electric vehicle. A battery 110 is capable of supplying sufficient voltage and current to power a motor 120, a cabin heater 130, and a DC/DC converter 140. All three of the motor 120, cabin heater 130, and DC/DC converter 140 are electrically coupled to the positive terminal of the battery 110 through the node A, and to the negative terminal of the battery 110 through node A'. In this example, the battery pack nominal voltage is 320V. There are two options to charge the battery 110. The first is an on-board charger 150, and the second is an off-board charger 160.

The on-board charger 150 is electrically coupled to the positive terminal of the battery 110 through node B and the negative terminal of the battery 110 through node B'. The on-board charger 150 is able to draw AC power from a wall plug and convert it into DC to charge the battery 110. The on-board charger 150 utilizes an AC/DC converter that is within the electric vehicle. Advantageously, all that is required is a power plug for connecting the vehicle to an appropriate power socket. As a result, it may be recharged most anywhere that a power socket is available. However, because the on-board charger 150 is constrained by the space available to it within the electric vehicle, the AC/DC converter is by extension also size limited. As a result, the amount of DC current the on-board charger 150 is able to generate is limited by size. So although convenient, it may take on the order of 5 hours to charge a battery pack. An off-board charger 160 is the second option. The off-board charger 160 is electrically coupled to the positive terminal of the battery 110 through the node C and the negative terminal of the battery 110 through the node C'. The off-board charger 160 is similar to the on-board charger 150 in that it comprises an AC/DC converter for converting an AC voltage from a wall to a DC voltage appropriate to charge the battery 110, in this example 320V. However, because the off-board charger 160 is not housed within the electric vehicle, it is not constrained by size. Therefore, the AC/DC converter therein is able to be larger and more robust than the AC/DC converter of the on-board charger 150. As a result, the off-board charger 160 is able to generate far more current, and charge the battery 320 much faster, on the order of an hour.

Nodes A, B and C are electrically coupled to the positive terminal of the battery 110 via switches 101, 102 and 103 respectively. The negative terminal of the battery 110 is electrically coupled to the nodes A', B' and C' through the switch 105. The switches 101-105 are preferably analog switches, such as contactors, relays or transistor devices, including bipolar, MOSFET, or IGBT implementations. In a charge condition, one of the switches 102 or 103 is closed to electrically couple one of the on-board charger 150 and off-board charger 160 respectively to the positive terminal of the battery 110. Switch 105 is closed as well. As a result, a charging loop is formed through B to B' or C to C'. However, as mentioned above, a battery must be above zero degrees C. in order to properly charge. Therefore, especially in cold weather climates, it is advantageous to have a battery pre heater 170. In this prior art, the battery pre heater 170 is electrically coupled to the DC/DC converter 140, and the switch 101 must be closed to form a path to power the DC/DC converter 140. Some battery pre heaters 170 work off of 12V DC. However, one of the switches 102, 103 must be closed depending on whether on-board or off-board charging is being utilized. Also, the switches 101 and 105 must be closed in order to form a closed circuit. Therefore, one of the loops B-B' or C-C' along with A-A' which is highly undesirable, since the battery 110 may be damaged beyond utility, or it may explode causing severe injury to a person that may be near it. What is needed is an electric vehicle battery pre-heating system wherein the heater is de-coupled from the charging apparatus during a pre-heating process.

SUMMARY OF THE INVENTION

What is provided is a system, method and apparatus for automatically de-coupling a battery from a charging system during a pre-heating stage for the battery. In some embodiments, a temperature sensor transmits a temperature of a battery to a controller which determines if the battery is at an appropriate temperature to receive a charge. If the battery is not, the battery is heated by a heater until the temperature sensor senses the appropriate temperature for the battery to receive a charge, at which point the battery is automatically coupled into a charging system.

In one aspect of the invention, a system for charging a battery in an electric vehicle comprises a battery, a heater for pre-heating the battery during a pre-charging stage, a charging means, and a switch for selectively coupling the charging means to one of the charger during a charging stage and the heater during a pre-charging stage. In some embodiments, the charging means comprises an on board AC-DC converter. Alternatively, the charging means comprises an off-board AC-DC converter. Preferably, the system further comprises a controller for controlling the switch and a temperature sensor for sensing a temperature of a battery. In some embodiments, the controller controls the switch based upon a temperature of the battery, by switching from a pre-charging stage to a charging stage when the battery reaches a pre-defined temperature. Alternatively, the controller switches from a pre-charging stage to a charging stage when the battery reaches a user configured temperature.

In another aspect of the invention, a method of charging a battery comprises sensing the temperature of a battery, heating a battery during a pre-charging phase, and coupling the battery to a charging means for charging the battery when the battery has reached a desired temperature. In one embodiment, coupling the battery to a charging means for charging the battery when the battery has reached a desired temperature comprises coupling the battery to an on board charger. Alternatively, coupling the battery to a charging means for charging the battery when the battery has reached a desired temperature comprises coupling the battery to an off board charger. Preferably, coupling the battery to a charging means for charging the battery when the battery has reached a desired temperature comprises programming a controller to selectively couple the charging means to one of the battery and a heater.

In another aspect of the invention, a system for charging a battery in an electric vehicle comprising a heater for heating a battery during a pre-charging phase, a charger for charging a battery during a charging phase, a switch for selectively coupling the charger to one of the battery during a charging phase and the heater during a pre-charging phase, a temperature sensor for sensing a temperature of the battery and a controller coupled to the temperature sensor for controlling the switch based upon the temperature of the battery. In some embodiments, a DC/DC converter for converting a voltage provided by the charger to a voltage appropriate for the heater is provided.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein or with equivalent alternatives. Reference will now be made in detail to implementations of the present invention as illustrated in the accompanying drawings. The same reference indicators will be used throughout the drawings and the following detailed description to refer to the same or like parts.

Figure 1:
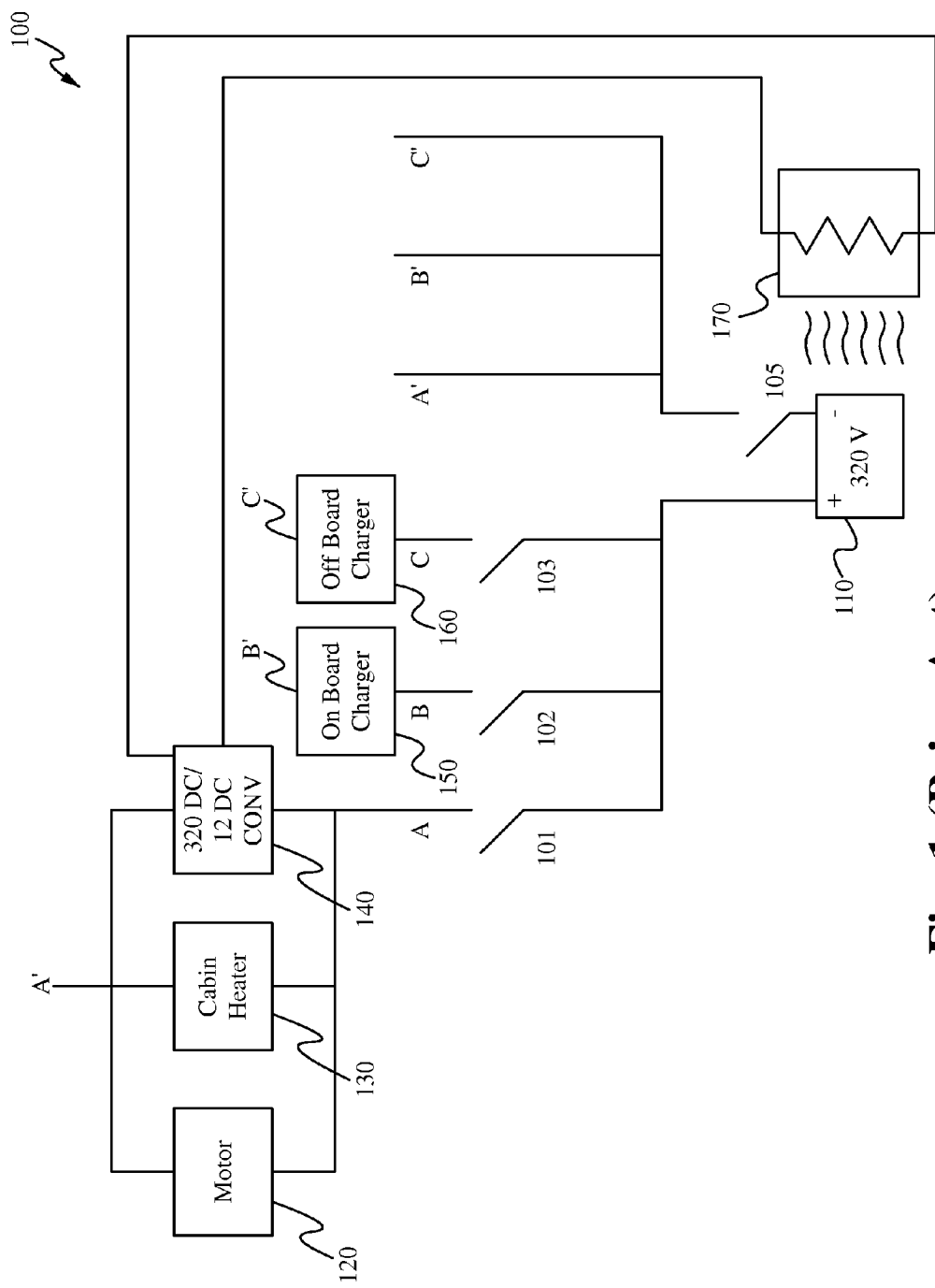
FIG. 1 shows a prior art system for charging an electric vehicle.
Figure 2:
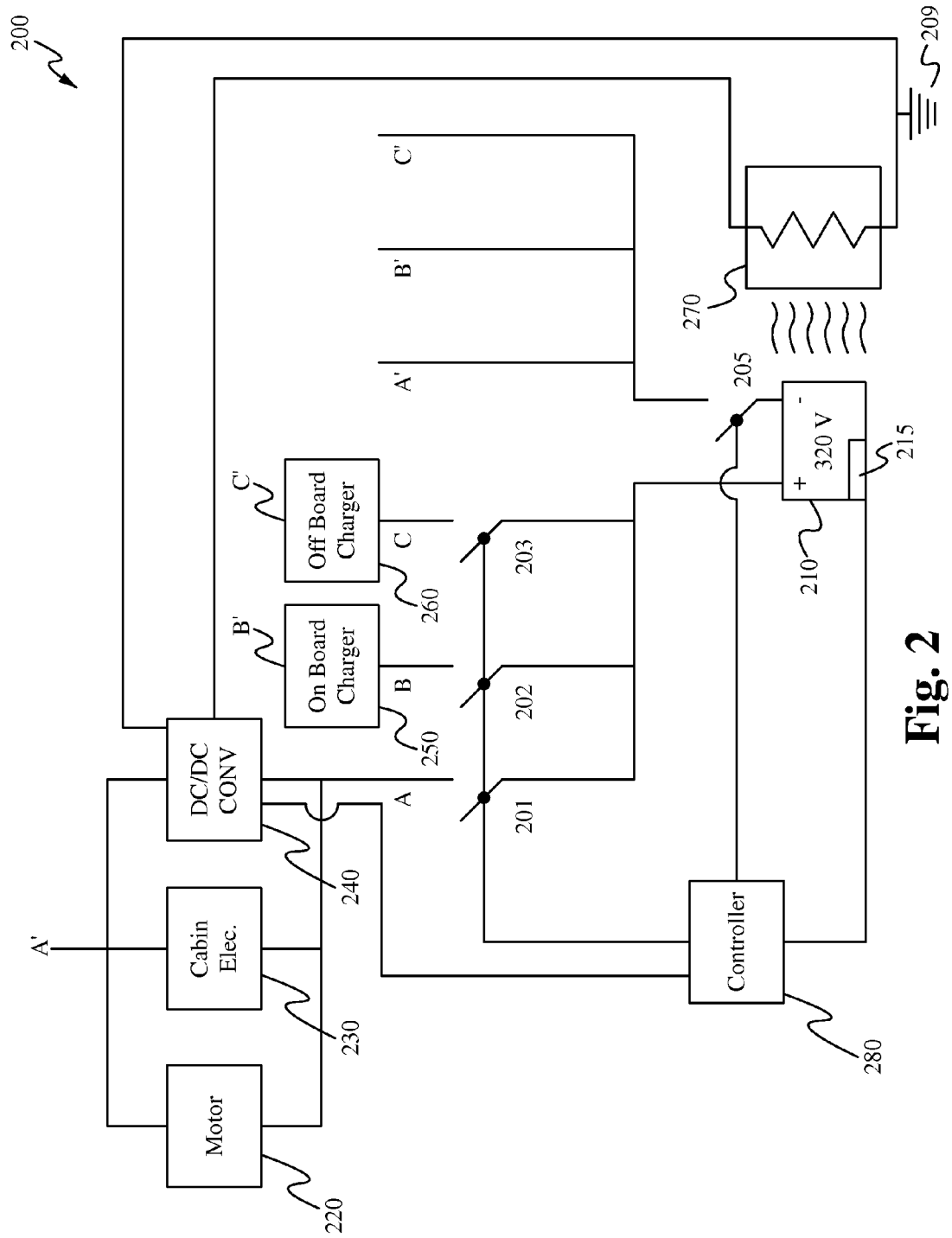
FIG. 2 shows a system for charging an electric vehicle per an embodiment of this invention.

FIG. 2 shows a battery pre-heating system 200 for charging the battery of an electric vehicle. What is provided is a system 200 for pre-heating a battery wherein a battery pack 210 is electrically disconnected during a pre-heating stage. The battery 210 is able to be charged by either an on-board charger 250 or an off-board charger 260. The on-board charger 250 is electrically coupled to the positive terminal of the battery 210 through node B. Similarly, the off-board charger 260 is electrically coupled to the positive terminal of the battery pack 210 through node C. As mentioned above, both the on-board charger 250 and off-board charger 260 couple power from an external source, such as a wall power socket, to the system 200 and the battery pack 210 specifically. Advantageously, what is provided in this embodiment is a system 200 wherein the battery pack 210 is de-coupled from the system 200 during a pre heating process. When one of the on-board charger 250 and off-board charger 260 are plugged into a wall socket, the switch 205 is initially in an open position, thereby making a closed circuit from the positive terminal of the battery pack 210 to one of the chargers 250 and 260 to the DC/DC converter 240 to the negative terminal of the battery pack 210 impossible. As a result, the battery pack 210 is disconnected. A controller 280 controls the switches 201, 202, 203, and 205. In this exemplary embodiment, the controller 280 is coupled to the DC/DC converter 240. For example, when the on-board charger 250 is plugged in, the switches 201 and 202 are initially closed, while switch 205 remains open. The DC/DC converter 240 is able to convert power from the charger 250, and convert into 12 V DC or any other appropriate voltage to power the controller 280. The controller 280 is also coupled to a temperature sensor 215 on the battery pack 210. The temperature sensor 215 is able to communicate a temperature of the battery pack 210 to the controller 280. As mentioned above, the battery pack 210 should preferably be above zero degrees C. to accept a charge. Preferably, the battery pack 210 is warmer than zero degrees C. also because its internal resistance drops with increasing temperature. The controller 280 is able to be programmed to an ideal pre-warming temperature for the battery pack 210 to accept a charge, for example 20 degrees C. When the battery pack 210 is below 20 degrees C., the controller 280 signals the DC/DC converter 240 to provide power to a battery pack heater 270. When the battery pack 210 has reached 20 degrees C., the temperature sensor 215 signals the controller 280 to switch off the battery pack heater 270. Alternatively, any pre-set temperature can be programmed into the controller 280. Still alternatively, a user can program a set temperature into the controller 280. At that point, the switch 201 is opened, electrically de-coupling the motor 220, cabin electronics 230, and DC/DC converter 240 from the system 200. The on-board charger 250 is then able to be used to charge the battery pack 210 by closing switch 205. If the on-board charger 250 is being used, the switches 202 and 205 are closed, and the switches 201 and 203 are open. A charging loop from the positive terminal of the battery pack 210, through node B to the on-board charger 250, to the negative terminal of the battery pack 210 through node B' is established and the battery pack 210 is charged. If the off-board charger 260 is being used, the switches 203 and 205 are closed, and the switches 201 and 202 are open. A charging loop from the positive terminal of the battery pack 210, through node C to the off-board charger 260, to the negative terminal of the battery pack 210 through node C' is established and the battery pack 210 is charged. Advantageously, only one of the chargers 250 and 260 and the battery pack 210 are in a circuit during a charging stage, and the battery pack 210 is excluded from the circuit during a pre-heating stage, hence protecting the battery pack 210.

In one exemplary method of use, the on board charger 250 is being used. If the ambient temperature of the battery 210 is below a desired temperature, the controller 280 closes switch 202 and switch 201, and opens switch 203 and switch 205, thereby forming an electrical path from the on board charger 202, to the DC to DC converter 240, to the heater 270 while electrically de-coupling the battery 210 from the system 200. Alternatively, if the off board charger 203 is to be used, and the temperature of the battery 210 is below a desired temperature, the controller 280 closes switches 201 and 203, while opening switches 202 and 205, thereby forming an electrical path from the off board charger 203 to the DC to DC converter 240 to the heater 270 while again electrically isolating the battery. During a charging phase, when the battery 210 is above a desired temperature, the controller opens switch 201 and closes 205, and closes one of switches 202 or 203, thereby forming an electrical path from one of the on board charger 250 or the off board charger 260 to the battery 210. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details.

We claim:

1. A system for charging a battery in an electric vehicle comprising:
   a. a battery, the battery having a master switch coupled to a second terminal of the battery;
   b. a heater for heating a battery during a pre-charging phase;
   c. an on board charger coupled to a first terminal of the battery through a first switch;
   d. an off board charger coupled to the first terminal of the battery through a second switch;
   e. a DC to DC converter coupled to the heater and to the first terminal of the battery through a third switch, wherein the DC to DC converter is also coupled to the on board charger through the third switch and first switch and to the off board charger through the third switch and second switch;
   f. a temperature sensor for sensing a temperature of the battery; and
   g. a controller for receiving the temperature of the battery, wherein the controller is coupled to the master switch, first switch, second switch, and third switch, wherein during a pre-charging phase, the controller opens the master switch, closes the third switch and one of the first switch and second switch thereby electrically isolating the battery while coupling the DC to DC converter to one of the on board charger and off board charger for providing power to the heater, and wherein in a charging phase, the controller closes the master switch, opens the third switch, and closes one of the first switch and second switch, thereby forming an electrical path from one of the on board charger and off board charger to the battery.

2. The system of claim 1 wherein the controller switches from the pre-charging phase to the charging phase when the temperature of the battery reaches a pre-defined temperature.

3. The system of claim 1 wherein the controller switches from the pre-charging phase to the charging phase when the battery reaches a user configured temperature.

4. A method of charging a battery comprising:
   a. defining a pre-charging stage;
   b. defining a charging stage;
   c. coupling one of an on board charger and an off board charger to a DC to DC converter, wherein the DC to DC converter supplies power to a heater for heating the battery while electrically isolating the battery from the on board charger, off board charger and DC to DC converter, during a pre-charging stage; and
   d. coupling one of the on board charger and the off board charger to the battery while electrically isolating the DC to DC converter from the battery during a charging stage.

5. The method of claim 4 wherein defining a pre-charging stage comprises determining a minimum temperature at which the battery accepts charge.

6. The method of claim 4 wherein defining a charging stage comprises determining a minimum temperature at which the battery accepts charge.

7. The method of claim 4 wherein coupling the battery to a charging means for charging the battery when the battery has reached a desired temperature comprises programming a controller to selectively couple at least one of the on board charger and the off board charger to one of the battery and a heater.

8. The system of claim 1 wherein the pre-charging phase is when the temperature of the battery is below a minimum temperature at which the battery accepts charge and a charge of the battery is below a minimum amount of charge at which the battery is operational for its intended use.

9. The system of claim 8 wherein the minimum temperature is at least zero degrees centigrade.

10. The system of claim 8 wherein the intended use is powering a motor of the electric vehicle.

11. The method of claim 4 further comprising electrically isolating the heater from the on board charger, off board charger, and a DC to DC converter when the temperature of the battery is at least at the minimum temperature.

12. The method of claim 4 wherein the pre-charging phase is when the temperature of the battery is below the minimum temperature and a charge of the battery is below a minimum amount of charge at which the battery is operational for its intended use.

13. The method of claim 4 wherein the battery is a battery of an electric vehicle.

* * * * *